(12) United States Patent
Lin

(10) Patent No.: US 7,377,816 B1
(45) Date of Patent: May 27, 2008

(54) CONNECTOR FOR RECEIVING/PROTECTING ELECTRONIC CARD

(75) Inventor: Le-Yao Lin, Taipei Hsien (TW)

(73) Assignee: Tai Twun Enterprise Co., Ltd., Taipei Hsien (TW)

( * ) Notice: Subject to any disclaimer, the term of this patent is extended or adjusted under 35 U.S.C. 154(b) by 0 days.

(21) Appl. No.: 11/782,759

(22) Filed: Jul. 25, 2007

(30) Foreign Application Priority Data

Jan. 26, 2007 (TW) .............................. 96201518 U

(51) Int. Cl.
*H01R 24/00* (2006.01)
(52) U.S. Cl. ..................................................... 439/630
(58) Field of Classification Search ................ 439/630, 439/181; 235/482
See application file for complete search history.

(56) References Cited

U.S. PATENT DOCUMENTS 6,099,353 A * 8/2000 Wu ............................ 439/630
6,716,066 B1 * 4/2004 Kuo ........................... 439/630
6,749,450 B1 * 6/2004 Chen .......................... 439/188
2005/0282439 A1 * 12/2005 Nagata ....................... 439/630

* cited by examiner

*Primary Examiner*—Phuong K Dinh
(74) *Attorney, Agent, or Firm*—Alan Kamrath; Kamrath & Associated PA

(57) ABSTRACT

A connector includes a housing having a card receiving space for selectively receiving one of two or more different electronic cards. A pivotal rod is mounted in the housing and normally spaced from a plurality of first terminals mounted in the card receiving space. When an electronic card of a first type is inserted into the card receiving space, it passes below the pivotal rod to a position in electrical contact with first terminals. When an electronic card of a second type is inserted into the card receiving space, it presses and pivots the pivotal rod to press the first terminals downward, allowing the second electronic card to move further inward for electrical contact with second terminals behind the first terminals while preventing electrical connection between the first terminals and the electronic card of second type.

7 Claims, 14 Drawing Sheets

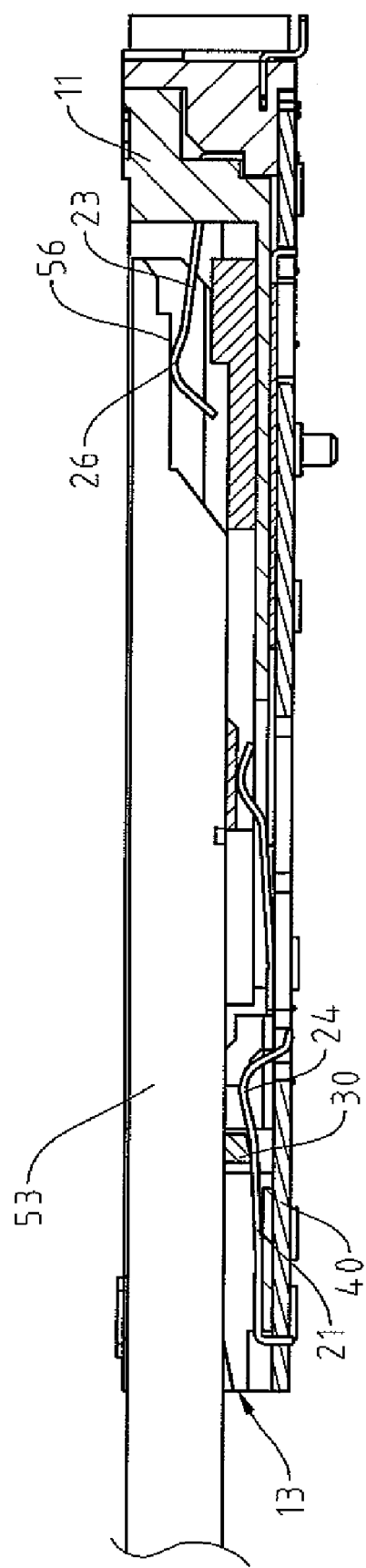

US 7,377,816 B1

CONNECTOR FOR RECEIVING/PROTECTING ELECTRONIC CARD

BACKGROUND OF THE INVENTION

The present invention relates to a connector and, more particularly, to a connector for receiving and protecting an electronic card.

Electronic cards are widely used in computers and electronic dictionaries for expanding memories, network cards, modems, and small computer system interfaces (SCSI) such as high-capacity hard disks, scanners, etc. In addition to personal computer memory card international association (PCMCIA) cards, electronic cards include multi-media cards (MMC), compact flash cards (CF), smart media cards (SMC), memory sticks (MS), secure digital memory cards (SD) for use in personal digital assistants (PDA), portable electronic dictionaries, digital cameras, etc.

Many general-purpose connectors have been developed for selectively receiving one of a plurality of different electronic cards. A typical general-purpose connector includes front, middle, and rear rows of terminals for respectively coupling with three different electronic cards such as an XD card, a secure digital memory card (SD), and a memory stick (MS). Such a connector further includes a swingable press plate for the front row of terminals such that a long, thick MS or SD card can be inserted into the connector to press the front row of terminals downward through the press plate for electrical connection with the middle or rear row of terminals. However, the press plate occupies a considerable space in the connector and requires support from the front row of terminals, resulting in adverse affect to structural stability. Furthermore, the press plate can not precisely press and move the front row of terminals such that the inclined portions of the front row of terminals might come in contact with the underside of an SD card or the metal housing of an MS and, thus, cause damage or a short circuit.

It is therefore a need in a general-purpose connector without the risk of short circuit.

SUMMARY OF THE INVENTION

The present invention solves this need and other problems in the field of general-purpose connectors by providing, in a preferred form, a connector including a housing having a card receiving space with a front opening to allow insertion of one of a first electronic card and a second electronic card different from the first electronic card. A longitudinal track is formed in each of two lateral walls defining the card receiving space and includes lower and upper track portions for selectively receiving one of two lateral edges of the first or second electronic card to be inserted into the card receiving space. A plurality of first terminals are mounted in the card receiving space. A plurality of second terminals are mounted in the card receiving space and behind the first terminals. A pivotal rod is pivotably mounted in the card receiving space and extends between the upper track portions. The pivotal rod is normally spaced from the first terminals. The first electronic card, when inserted into the card receiving space, passes below the pivotal rod to a position in electrical contact with the first terminals. The second electronic card, when inserted into the card receiving space, presses and pivots the pivotal rod to press the first terminals downward, allowing the second electronic card to move further inward for electrical contact with the second terminals while preventing electrical connection between the first terminals and the second electronic card.

In the most preferred form, a plurality of third terminals are mounted in the card receiving space and behind the second terminals. The card receiving space is capable of receiving a third electronic card different from the first and second electronic cards. The third electronic card, when inserted into the card receiving space, presses and pivots the pivotal rod to press the first terminals downward, allowing the third electronic card to move further inward for electrical contact with the third terminals while preventing electrical connection between the first and second terminals and the third electronic card. Each longitudinal track further includes a recessed portion having a groove extending from an inner face through an outer face of a bottom wall defining the card receiving space. An extension groove extends perpendicularly from one of the grooves. The pivotal rod includes an arm extending perpendicularly from each of two ends thereof and pivotably received in one of the grooves. An axle is formed on each arm and pivotably engaged with one of the grooves. A coil spring is mounted on one of the axles and includes a first tang abutting against a protrusion on one of the axles and a second tang mounted in the extension groove. The pivotal rod is biased by the coil spring to the position spaced from the first terminals.

The present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where:

FIG. 14 is a cross-sectional view of the connector of FIG. 3 with an MS card in a completely inserted state.

Figure 1:
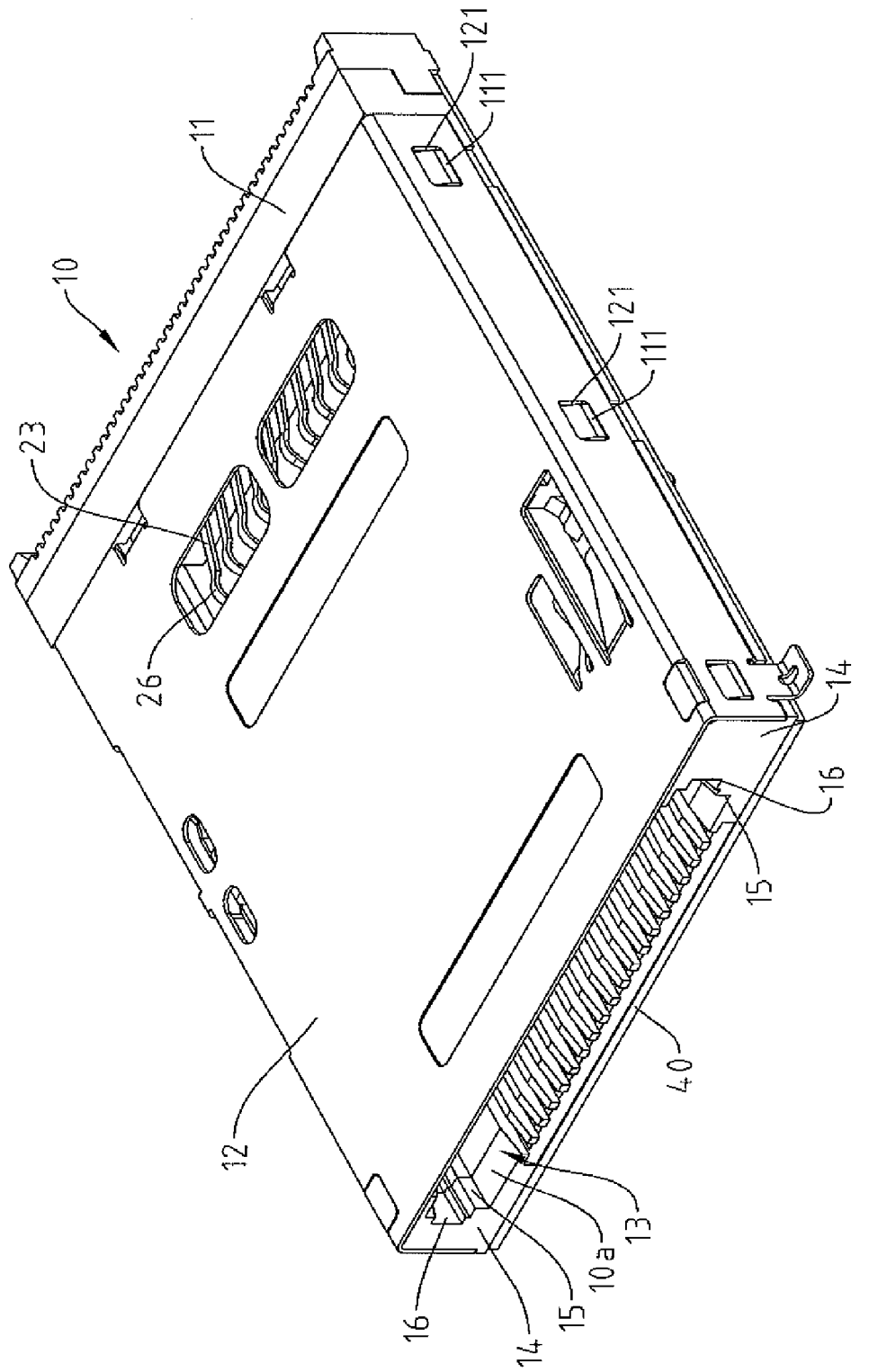
FIG. 1 is a perspective view of a connector for receiving/protecting an electronic card according to the preferred teachings of the present invention.
Figure 2:
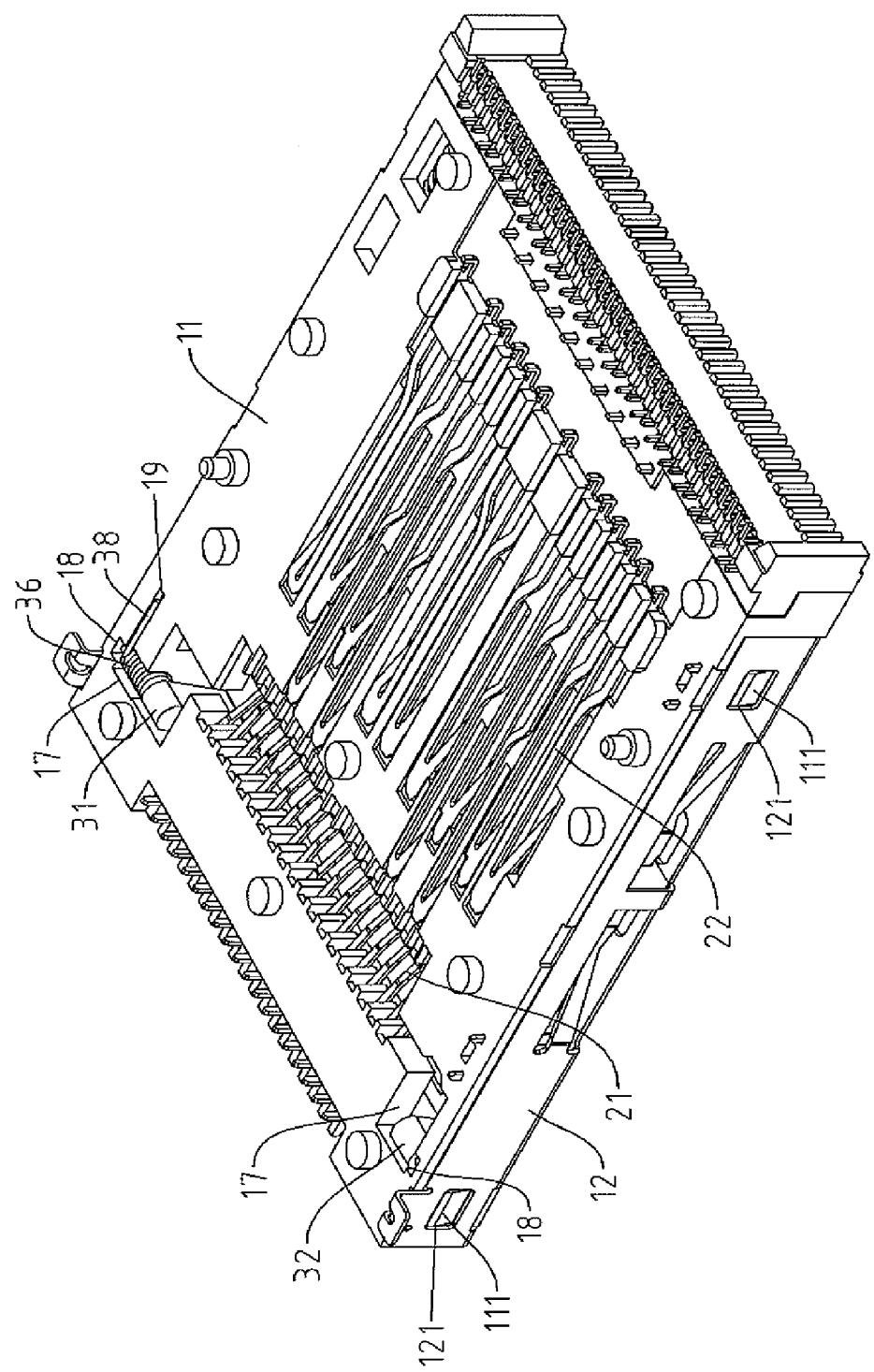
FIG. 2 is a bottom perspective view of the connector of FIG. 1 with a bottom cover removed.
Figure 3:
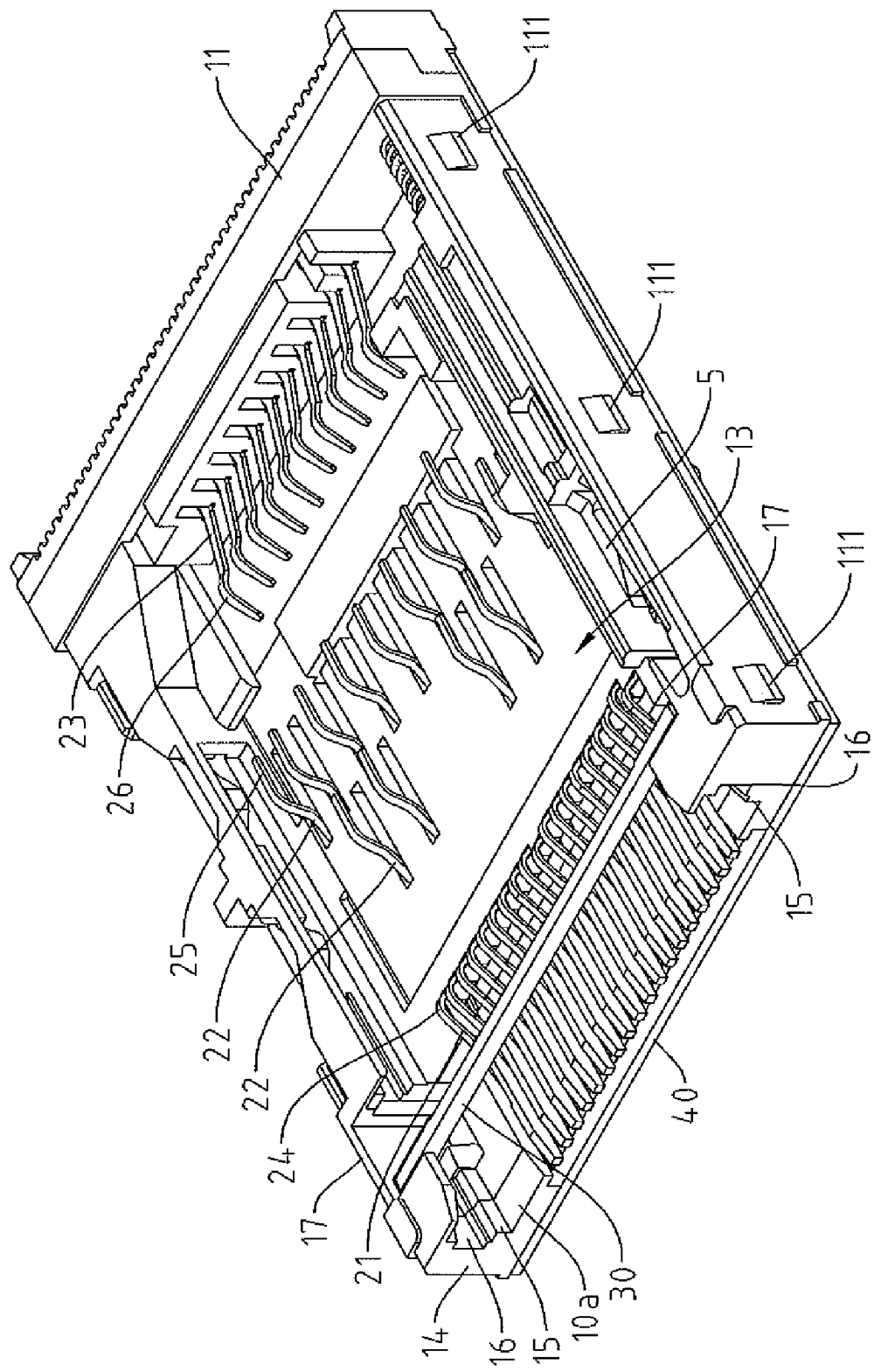
FIG. 3 is a perspective view of the connector of FIG. 1 with a top cover removed.
Figure 4:
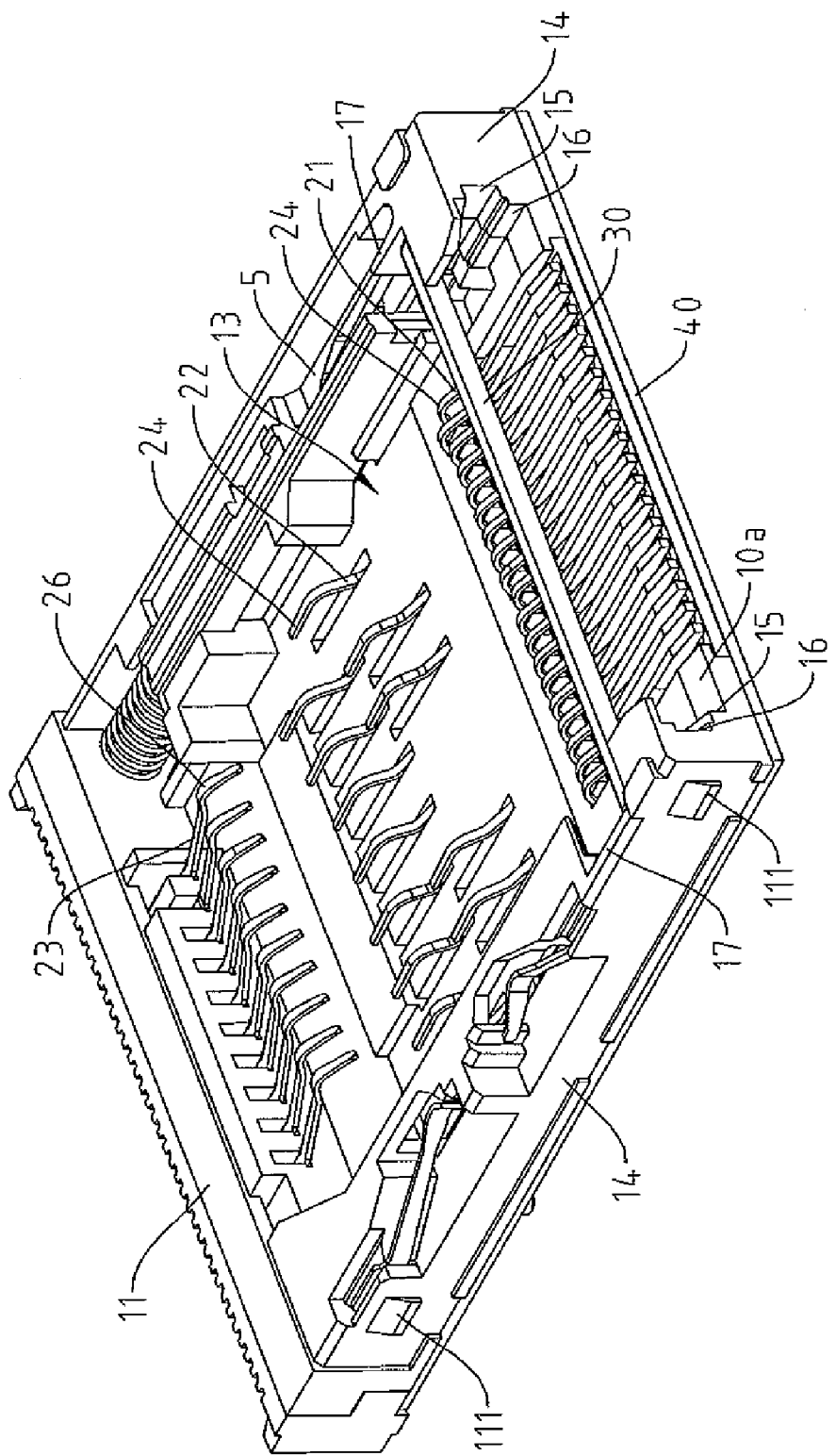
FIG. 4 is another perspective view showing the other side of the connector of FIG. 3.
Figure 5:
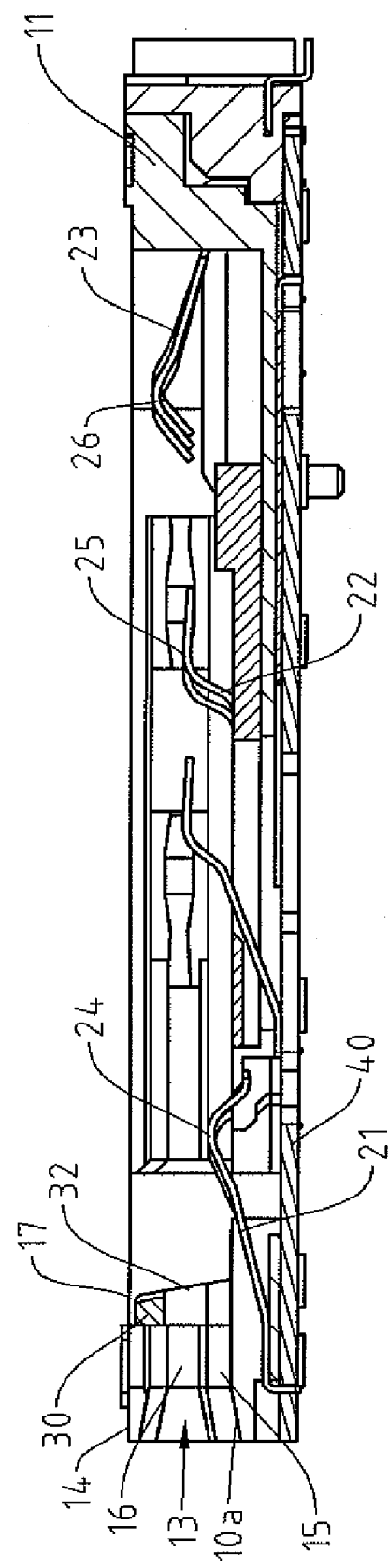
FIG. 5 is a cross-sectional view of the connector of FIG. 3.
Figure 6:
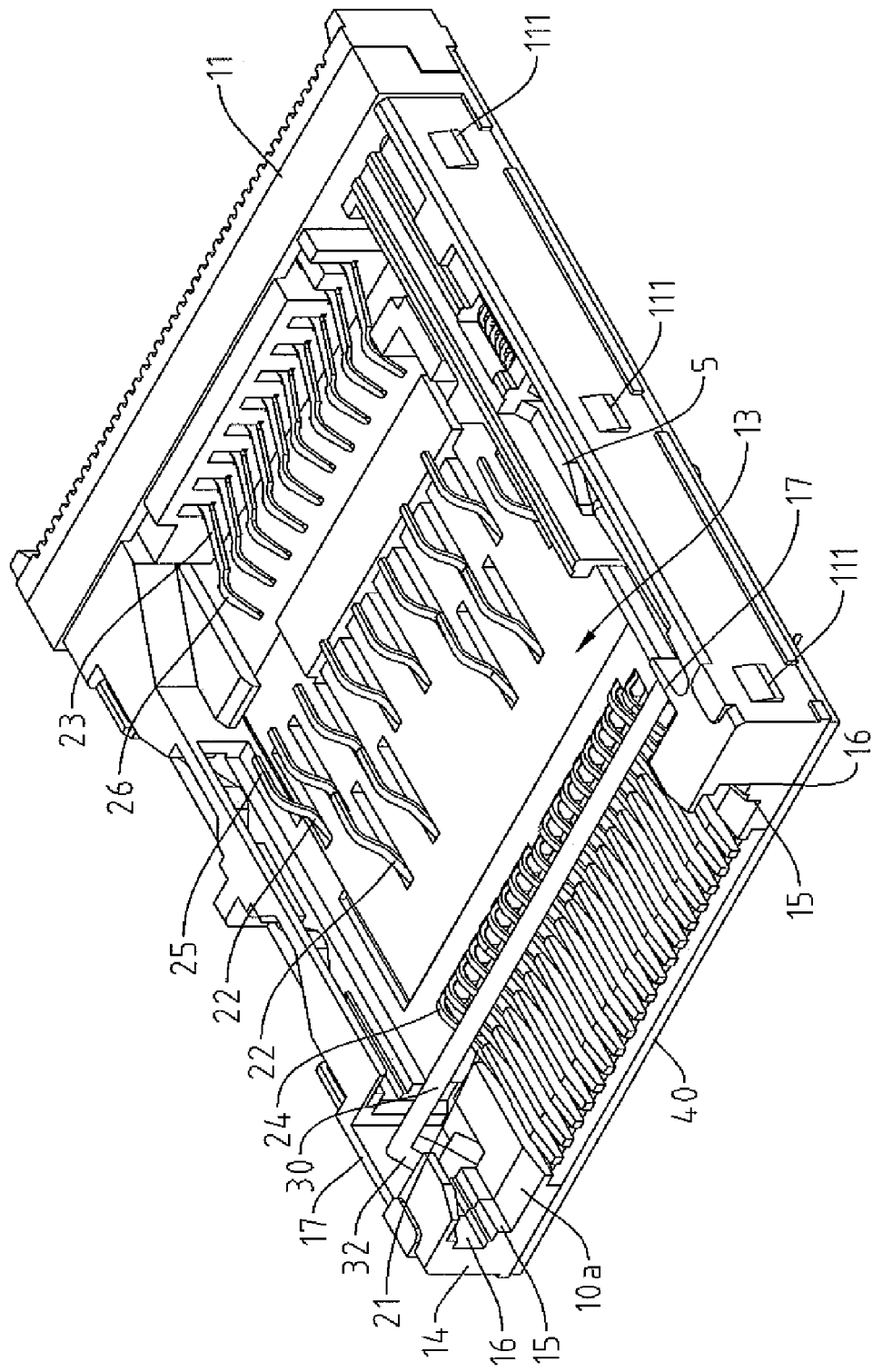
FIG. 6 is a perspective view of the connector of FIG. 3 with a pivotal rod pivoted.
Figure 7:
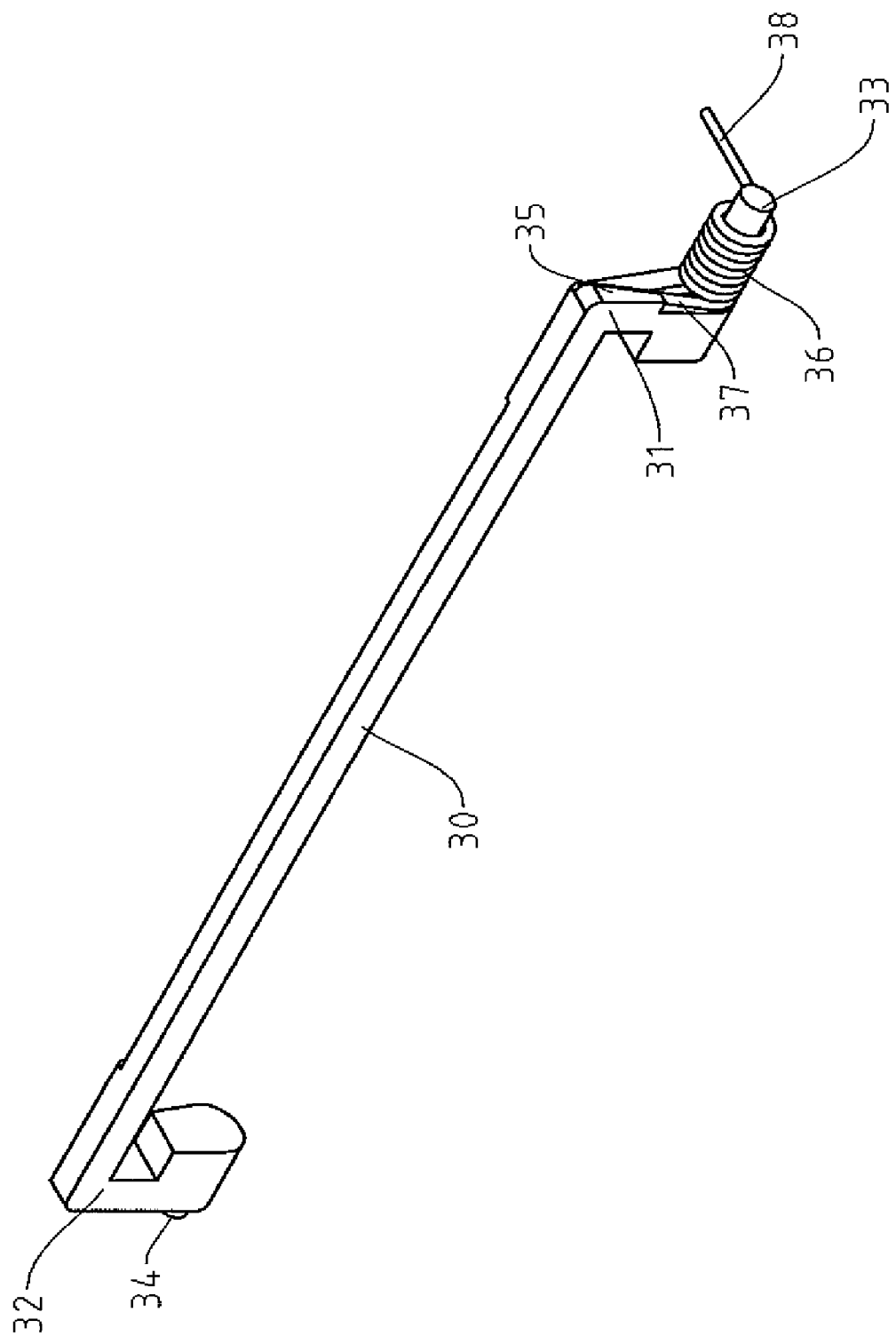
FIG. 7 is a top perspective view of the pivotal rod of FIG. 6.
Figure 8:
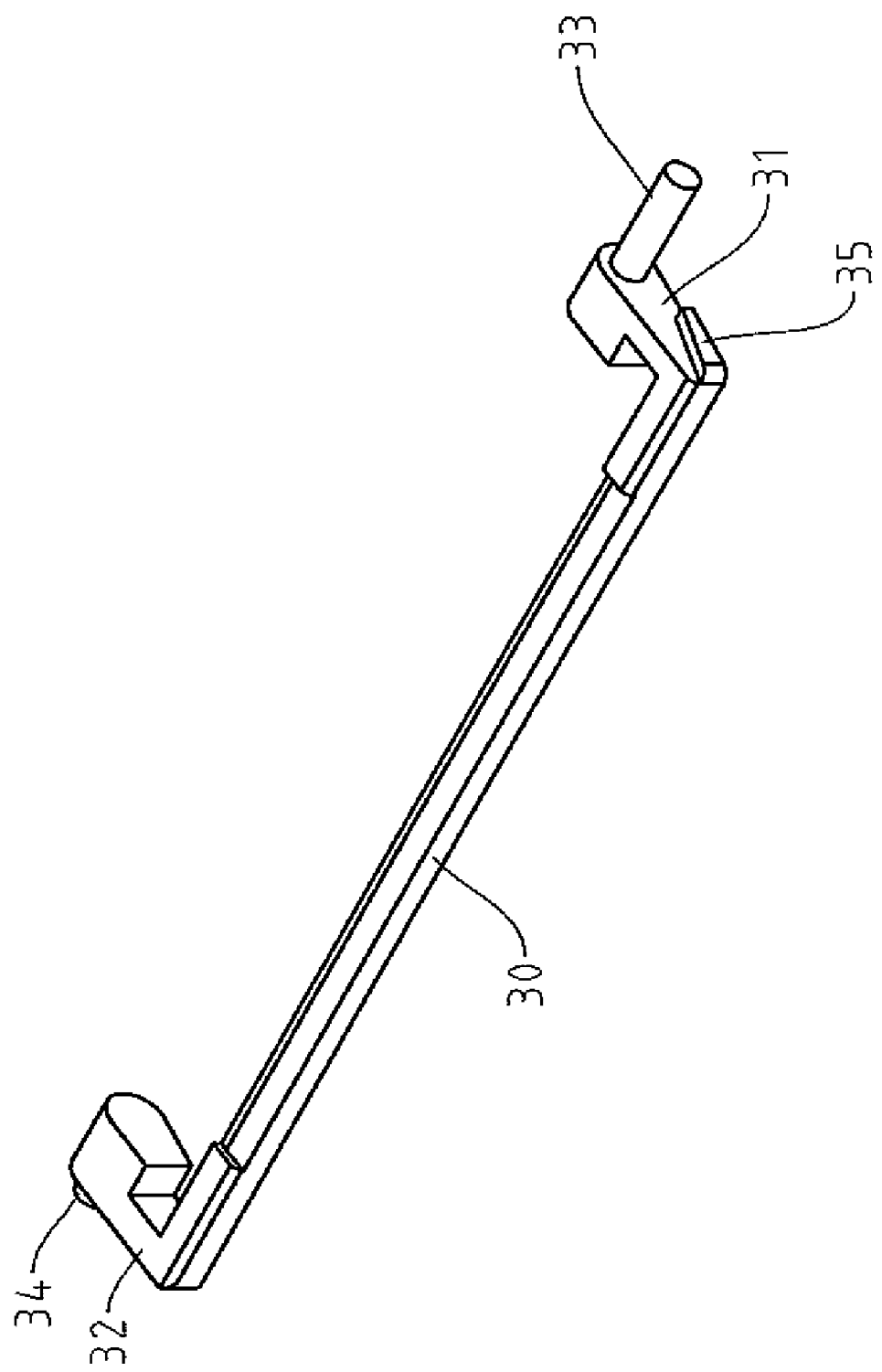
FIG. 8 is a bottom perspective view of the protective plate of FIG. 7.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "top", "bottom", "behind", "front", "rear", "end", "portion", "section", "corner", "longitudinal", "lateral", "outward", "inward", "forward", "rearward", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

A connector for receiving/protecting an electronic card according to the preferred teachings of the present invention is shown in the drawings. The connector removably receives one of a plurality of different electronic cards including but not limited to first, second, and third electronic cards 51, 52, and 53 such as an XD card, an SD card, and an SD card.

According to the preferred form shown, the connector includes a housing 10 having an insulating seat 11 and a top cover 12 mounted on top of the insulating seat 11 to define a card receiving space 13 with a front opening 10a through which an electronic card of a desired type is inserted into the card receiving space 13. A longitudinal track 14 is formed in each of two lateral walls defining the card receiving space 13 for receiving one of two lateral edges of the electronic card to be inserted into the card receiving space 13. Each longitudinal track 14 includes a lower track portion 15 and an upper track portion 16 above the lower track portion 15. Each longitudinal track 14 further includes a recessed portion 17. The recessed portions 17 are on opposite sides of the first set of terminals 21. In the most preferred form shown, each recessed portion 17 includes an groove 18 extending from an inner face of the bottom wall of the insulating base 11 through an outer face of the bottom wall of the insulating base 11 and in communication with the upper and lower track portions 15 and 16, and an extension groove 19 is formed in the bottom face of the bottom wall of the insulating base 11 and extends perpendicularly from the groove 18 of one of the recessed portions 17. The insulating seat 11 includes a plurality of protrusions 111, and the top cover 12 includes a plurality of holes 121 for engaging with the protrusions 111 to thereby fix the top cover 12 to the insulating seat 11.

First, second, and third sets of terminals 21, 22, and 23 are mounted on the bottom wall of the insulating base 11 defining the card receiving space 13 and include resilient end portions 24, 25, and 26 for selective electrical contact with the first, second, and third electronic cards 51, 52, and 53. In the most preferred form shown, the second set of terminals 22 are arranged in two rows for coupling with the first electronic card 51 (such as an SD card or an MMC). The first set of terminals 21 are located in front of and spaced from the second set of terminals 22 whereas the third set of terminals 23 are located behind and spaced from the second set of terminals 22.

A pivotal rod 30 is mounted in a front end of the card receiving space 13 where the first set of terminals 21 locate. In the most preferred form shown, the pivotal rod 30 includes an arm 31, 32 extending perpendicularly from each of two ends thereof, with an axle 33, 34 formed on each arm 31, 32. Each arm 31, 32 is pivotably received in one of the grooves 18. The axles 33 and 34 pivotably engaged with holes in the walls defining the grooves 18 and define pivot axes to allow pivotal movement of the arms 31 and 32 and, hence, the pivotal rod 30 that extends across the first set of terminals 21 and between the upper track portions 16. An elastic element 36 is provided for biasing the pivotal rod 30 to in a position above and spaced from the first set of terminals 21. In the most preferred form shown, the elastic element 36 is a coil spring mounted around the axle 33 and includes a first tang 37 abutting against a protrusion 35 on the arm 31 and a second tang 38 mounted in the extension groove 19. In assembly, the arms 31 and 32 of the pivotal rod 30 are mounted into the grooves 18 from the outer face of the bottom wall of the insulating base 11, and a bottom cover 40 is mounted to the insulating base 11 to cover the outer face of the bottom wall.

Figure 9:
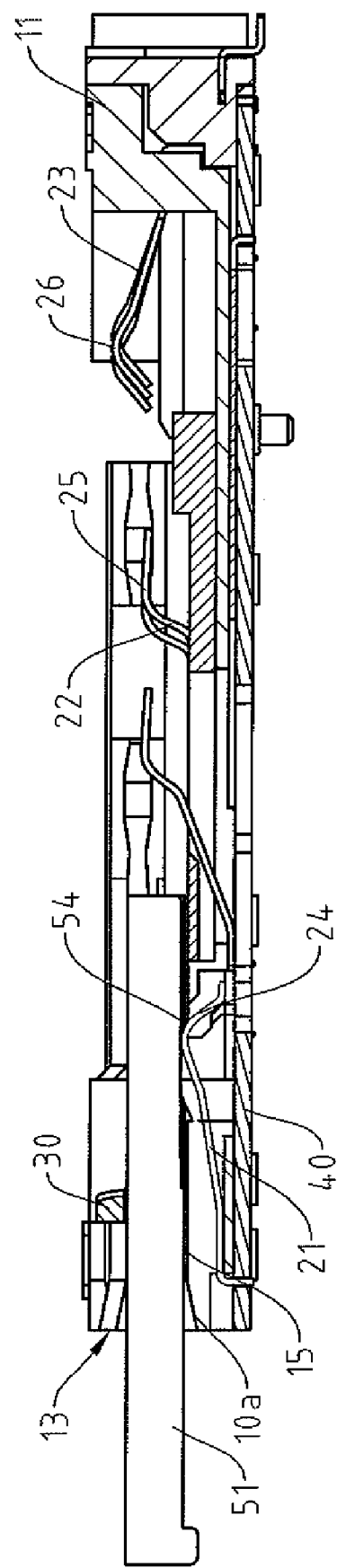
FIG. 9 is a cross-sectional view of the connector of FIG. 3 with an XD card in an inserted state.
Figure 10:
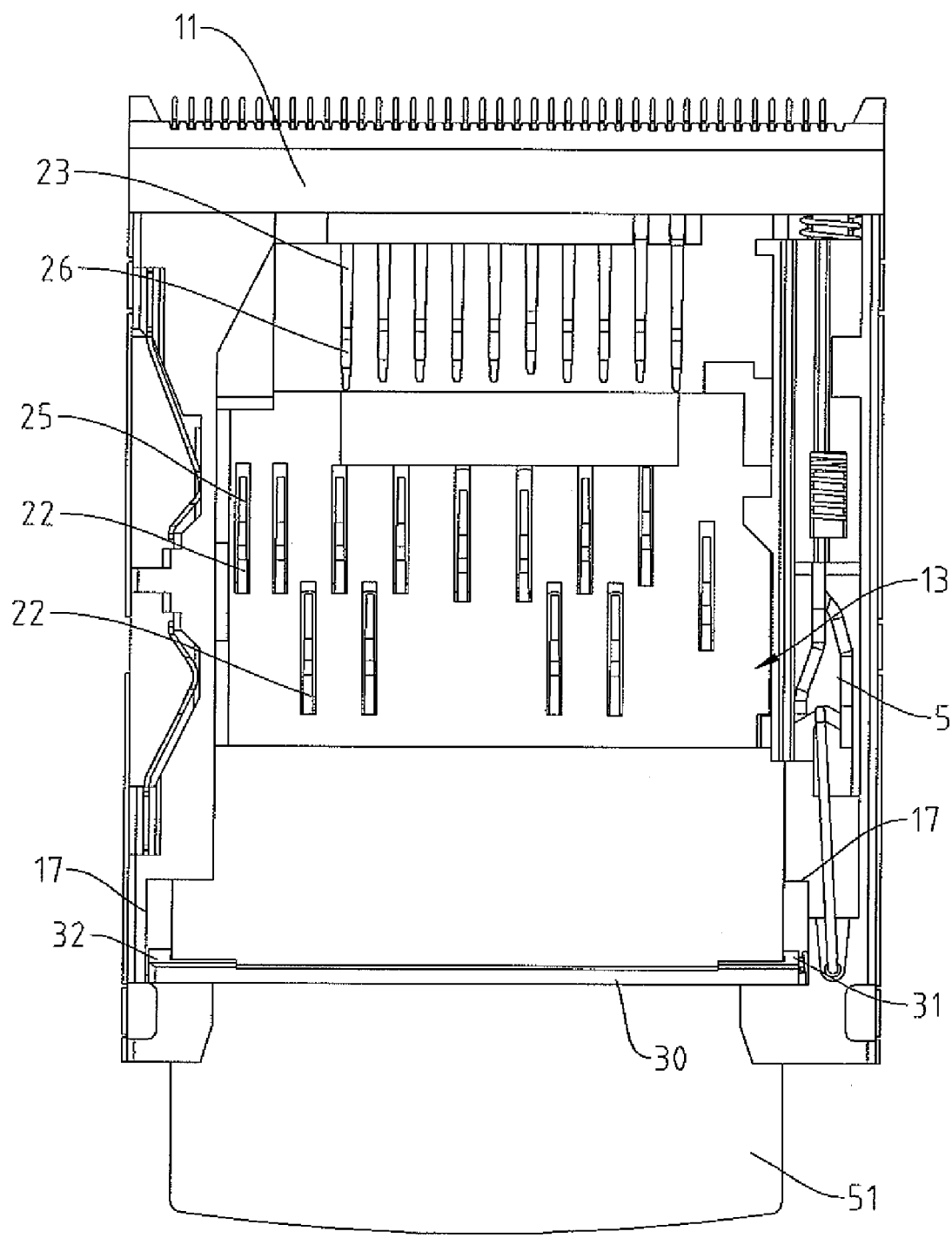
FIG. 10 is a top view of the connector of FIG. 9.

With reference to FIGS. 9 and 10, in a case that the first electronic card 51 (such as an XD card) is inserted into the card receiving space 13 via the front opening 10a, two lateral edges of the second electronic card 51 slide in the lower track portions 15 and the second electronic card 51 passes below the pivotal rod 30 by pushing the pivotal rod 30 upward until contacts 54 of the first electronic card 51 are in electrical contact with the end portions 24 of the first set of terminals 21. The bottom edge of the pivotal rod 30 is at a height corresponding to a top face of the first electronic card 51 to avoid upward movement of the first electronic card 51 during insertion.

Figure 11:
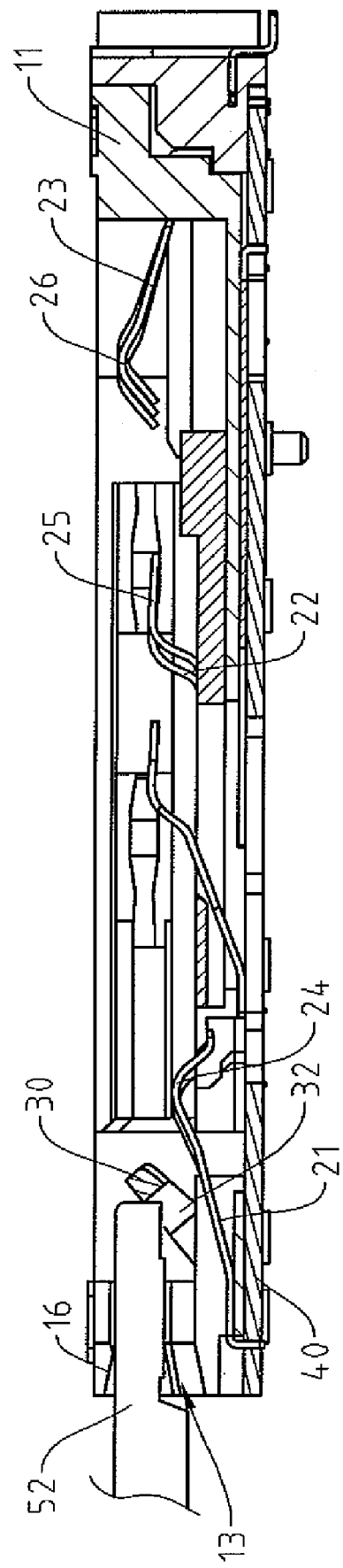
FIG. 11 is a cross-sectional view of the connector of FIG. 3 with an SD card in an initial stage of insertion into the connector.
Figure 12:
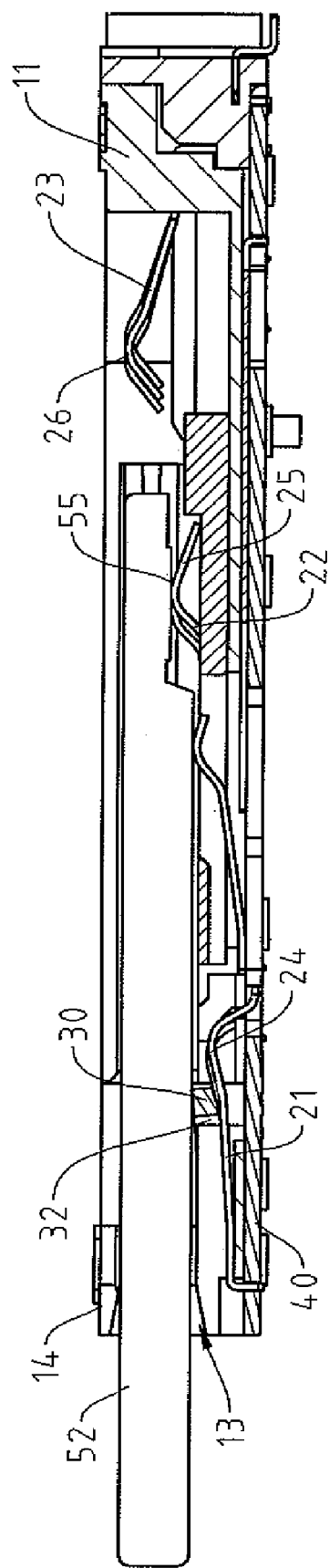
FIG. 12 is a cross-sectional view of the connector of FIG. 3 with an SD card in a completely inserted state.
Figure 13:
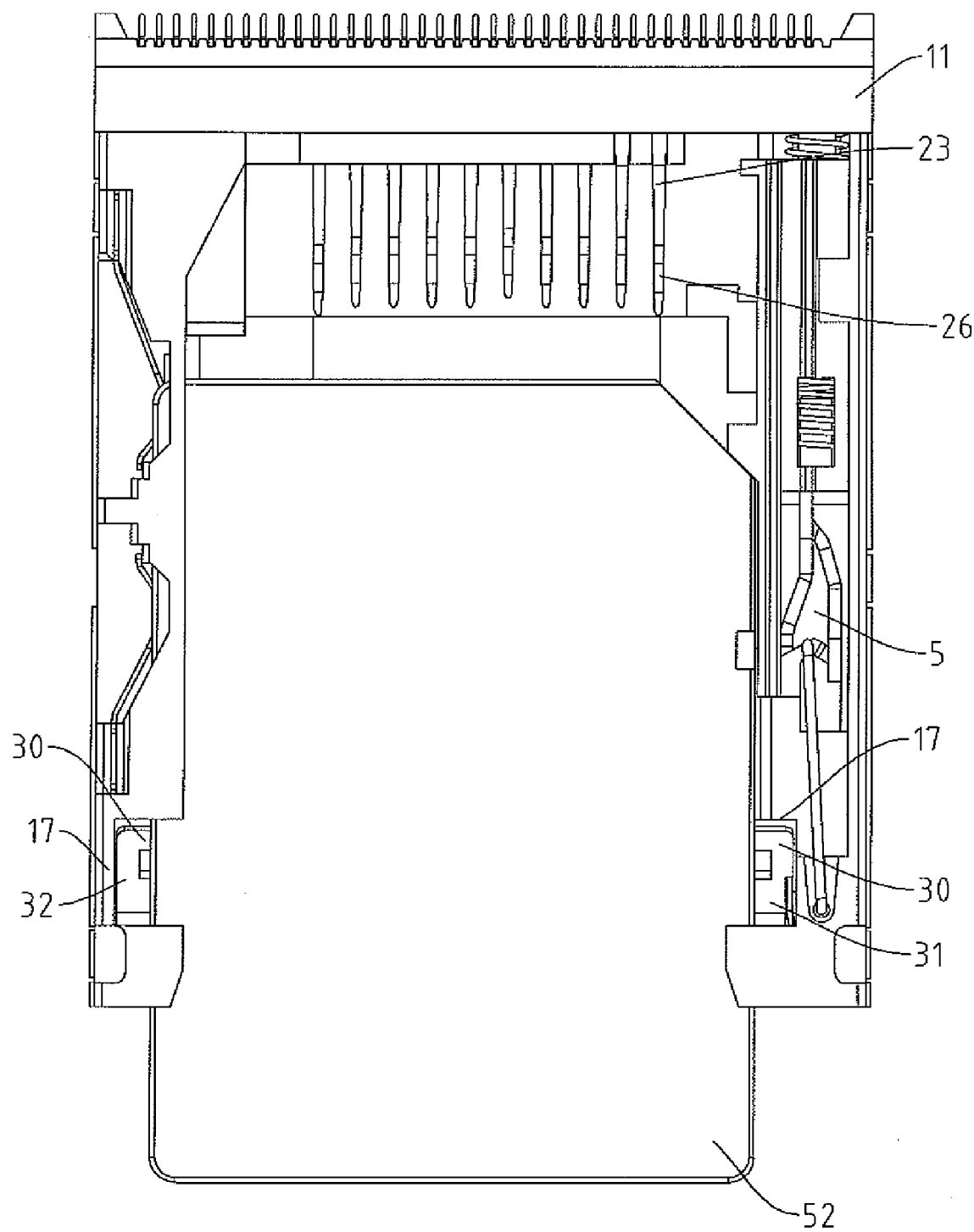
FIG. 13 is a top view of the connector of FIG. 12.

With reference to FIG. 11, in a case that a second electronic card 52 (such as an SD card) is inserted into the card receiving space 13, two lateral edges of the second electronic card 52 slide in the upper track portions 16 and the second electronic card 52 presses the pivotal rod 30. The pivotal rod 30 pivots downward to press the end portions 24 of the first set of terminals 21. The second electronic card 52 is inserted further inward until contacts 55 of the second electronic card 52 are in electrical contact with the end portions 25 of the second set of terminals 22 (see FIGS. 12 and 13).

With reference to FIG. 14, in a case that a third electronic card 53 (such as an MS card) is inserted into the card receiving space 13, two lateral edges of the third electronic card 53 slide in the upper track portions 16 and the third electronic card 53 presses the pivotal rod 30. The pivotal rod 30 pivots downward to press the end portions 24 of the first set of terminals 21. The third electronic card 53 is inserted further inward until contacts 56 of the third electronic card 53 are in electrical contact with the end portions 26 of the third set of terminals 23.

The connector according to the preferred teachings of the present invention further includes an ejection mechanism 5 for ejecting the electronic card 51, 52, or 53. The ejection mechanism 5 may be of but not limited to any commercially available types.

The connector according to the preferred teachings of the present invention can selectively receive one of three different types of electronic connectors 51, 52, 53, wherein an XD card 51 can directly pass below the pivotal rod 30 to contact with the first set of terminals 21, and wherein an SD card or an MS card can pass above the pivotal rod 30 and pivot the pivotal rod 30 downward to move the first set of terminals 21 to a position not in electrical connection with the SD card or MS card, avoiding occurrence of short circuits and damage resulting from impact.

Thus since the invention disclosed herein may be embodied in other specific forms without departing from the spirit or general characteristics thereof some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A connector comprising
a housing including a card receiving space having a front opening allowing insertion of one of a first electronic card and a second electronic card different from the first electronic card, with a longitudinal track being formed in each of two lateral walls defining the card receiving space, with each said longitudinal track including a lower track portion for receiving one of two lateral edges of the first electronic card to be inserted into the card receiving space and an upper track portion for receiving one of two lateral edges of the second electronic card to be inserted into the card receiving space;
a plurality of first terminals mounted in the card receiving space;
a plurality of second terminals mounted in the card receiving space and behind the plurality of first terminals;
a pivotal rod pivotably mounted in the card receiving space and extending between the upper track portions, with the pivotal rod being normally spaced from the plurality of first terminals,
with the first electronic card, when inserted into the card receiving space, passing below the pivotal rod to a position in electrical contact with the plurality of first terminals, and
with the second electronic card, when inserted into the card receiving space, pressing and pivoting the pivotal rod to press the plurality of first terminals downward, allowing the second electronic card to move further inward for electrical contact with the plurality of second terminals while preventing electrical connection between the plurality of first terminals and the second electronic card.

2. The connector as claimed in claim 1, further comprising a plurality of third terminals mounted in the card receiving space and behind the plurality of second terminals, with the card receiving space being capable of receiving a third electronic card different from the first and second electronic cards, with the third electronic card, when inserted into the card receiving space, pressing and pivoting the pivotal rod to press the plurality of first terminals downward, allowing the third electronic card to move further inward for electrical contact with the plurality of third terminals while preventing electrical connection between the plurality of first and second terminals and the third electronic card.

3. The connector as claimed in claim 1, with each said longitudinal track further including a recessed portion, with the pivotal rod including an arm extending perpendicular from each of two ends thereof and pivotably received in one of the recessed portions, with an axle being formed on each said arm and pivotably engaged with one of the recessed portions and defining a pivot axis for the arm, and with an elastic element mounted to one of the arms for biasing the pivotal rod to the position spaced from the plurality of first terminals.

4. The connector as claimed in claim 3, with the elastic element being a coil spring mounted around one of the axles and including a first tang abutting against the pivotal rod and a second tang fixed in one of the recessed portions.

5. The connector as claimed in claim 4, with one of the arms of the pivotal rod including a protrusion against which the first tang of the coil spring abuts, with one of the recessed portions including an extension groove extending therefrom, and with the second tang of the coil spring being mounted in the extension groove.

6. The connector as claimed in claim 4, with a bottom wall defining the card receiving base including an inner face and an outer face, with each said recessed portion including a groove extending from the inner face through the outer face of the bottom wall and in communication with the upper and lower track portions, with the arms of the pivotal rod being respectively and pivotably received in the grooves, with the connector further comprising a bottom cover mounted to cover the bottom wall.

7. The connector as claimed in claim 1 with the housing including a bottom wall defining the card receiving space and having an inner face and an outer face, with each said longitudinal track further including a recessed portion having a groove extending from the inner face through the outer face of the bottom wall, with an extension groove extending perpendicularly from one of the grooves, with the pivotal rod including an arm extending perpendicularly from each of two ends thereof and pivotably received in one of the grooves, with one of the arms including a protrusion, with an axle being formed on each said arm and pivotably engaged with one of the grooves, with the connector further comprising, in combination: a coil spring mounted on one of the axles and including a first tang abutting against the protrusion and a second tang mounted in the extension groove, and with the pivotal rod being biased by the coil spring to the position spaced from the first terminals.

* * * * *